Nov. 27, 1923. 1,475,848
W. H. MARTIN
METHOD OF DETERMINING THE POSITION OF THE CENTER OF GRAVITY OF
ROTARY BODIES WITH RESPECT TO THE AXIS OF ROTATION
Filed Aug. 1, 1918
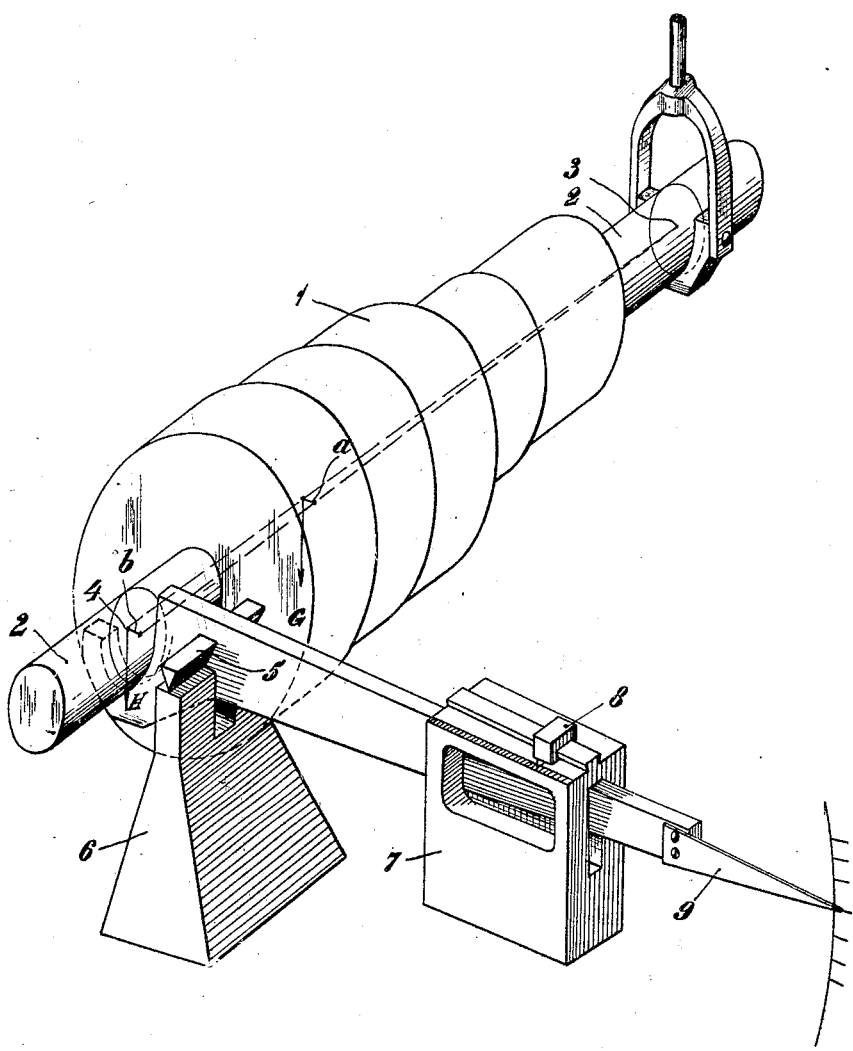
INVENTOR
WILLIAM HAMILTON MARTIN
BY Howson and Howson
his ATTORNEYS Patented Nov. 27, 1923.

1,475,848

UNITED STATES PATENT OFFICE.

WILLIAM HAMILTON MARTIN, OF FLUSHINGS, NETHERLANDS.

METHOD OF DETERMINING THE POSITION OF THE CENTER OF GRAVITY OF ROTARY BODIES WITH RESPECT TO THE AXIS OF ROTATION.

Application filed August 1, 1918. Serial No. 247,896.

*To all whom it may concern:*

Be it known that I, WILLIAM HAMILTON MARTIN, engineer, a subject of the Queen of the Netherlands, residing at Flushings, the Netherlands, have invented certain new and useful Improvements in a Method of Determining the Position of the Center of Gravity of Rotary Bodies with Respect to the Axis of Rotation, of which the following is a specification.

The present invention relates to a method of locating the center of gravity of a rotary body with relation to its axis of rotation.

Bodies rotating at a high speed should be balanced—that is the center of gravity should coincide as closely as possible with the axis of rotation—to insure smooth running.

It has already been proposed to ascertain this condition in two different ways: first, statically, by which method the body is balanced on knife edges at its axis of rotation and inequalities met by means of counterweights, or second, dynamically, i. e. by rotating the body at a high speed, observing the oscillations and deducing therefrom the corrections required to secure an exact balance.

The second method leads to the more exact results. By it the eccentricity of the center of gravity may be located with a precision of 12 to 14 thousandths of a millimetre.

The present invention, however, attains a precision more than ten times greater, and has the advantage furthermore that the means employed are simple and the time consumed in the operation very short, while a precision of less than one thousandth of a millimetre is attained.

The method consists in mounting the rotary body in a sensitive balance, by which variations in the movement of the weight resulting from changes in the position of the rotary body are determined.

The simplest and most efficient application of the method is secured by supporting the rotary body at one end on its axis of rotation, (for example by means of a universal joint) the other end being supplemented in the indicator balance.

In the accompanying drawing, an apparatus for carrying out the invention is shown in perspective.

1 represents the rotor of a turbine, whose shaft 2 is suspended at 3 by means of a universal joint and supported at 4 by one arm of a sensitive balance lever, which rests through knife edges 5 on the supporting piece 6 and is provided with an adjustable counterweight 7 on its other arm and an associated separate small sliding weight 8. The pointer 9 at the end of the balance arm passes over a scale arranged a suitable distance from the support 6.

In Figure 1 the position of the center of gravity which is supposed to lie at a distance $a$ from the axis of rotation, is indicated by Z. The weight G of the rotor, bearing at the points 3 and 4 of the shaft, exerts at the latter point a weight H depending on the position of the center of gravity between the points 3 and 4. From the drawing it results now that the distance $b$ at which the weight H may be supposed to act relative to the axis of rotation, is greater than $a$ in the same proportion as H is smaller than G. The moment of H relative to the axis of rotation is consequently the same as the moment of G and this moment may easily be found by weighing in the following manner.

The rotor being placed in the supports the balance lever is brought into equilibrium by means of the adjustable counterweight 7.

The rotor is then turned through a certain angle, for example ⅛th of a revolution, being preferably lifted clear of the balance lever during this partial rotation. Being placed again on the balance in its second position, the balance lever is brought to its original position of equilibrium indicated by the pointer 9 on the scale, by means of the small sliding weight 8.

The rotor is then turned over another ⅛th of a revolution and the balance again brought into equilibrium, this manipulation being repeated several times until the rotor has made a complete revolution.

The record of the displacements of the sliding weight 8 requisite to restore the pointer 9 to its original position of equilibrium affords means for deducing at once approximately the location of the axis of rotation with relation to the center of gravity. The exact location is easily found by charting. Thus, the positions of the sliding weight are plotted on a chart, and the curve drawn through the points thus plotted forms a sinus-line showing a maximum and a minimum corresponding to the positions of the rotor when the center of gravity lies at the greatest and at the smallest distance from the supporting point of the balance.

The variation in the moment occurring at one side of the balance supporting point when the rotor is turned, must be equal to the variation in the moment at the other side in consequence of the displacement of the sliding weight 8. The latter moment which is the mathematical product of the weight and the displacement of the sliding weight, is equal to twice the moment $H \times b$, and consequently also to twice the moment of the weight of the rotor with respect to the axis of rotation. From this moment and the rotor weight the eccentricity $a$ may easily be deduced.

The sensitiveness of the balance may be increased without difficulty to such a degree that when weighing a rotor of 10.000 kilogrammes a variation in the moment of 1 kilogramme-centimetre may easily be indicated by means of a sliding weight of 1 kilogramme for example; this corresponds to a deviation of the center of gravity of the rotor in a horizontal direction of 0,0005 millimetre.

It is necessary in view of the sensitiveness of balance that during the whole weighing process the rotor shaft should lie exactly in the same place in the balance. This may easily be attained when the sharp collar or ring turned on the shaft and acting as a centrifugal oil remover is placed on copper linings in the balance, since the collar presses into these linings and forms a groove in them which insures the correct position of the rotor at the successive weighings.

It is clear that in order to balance the rotor, a moment equal to that of the weight must be added to the rotor to render the latter heavier at the side opposite to the center of gravity, or preferably by reducing the rotor weight at the side of the center of gravity. The balancing method therefore essentially consists in that a moment equal to the value of the total displacement of the sliding weight, multiplied by its weight, is taken from the rotor by a small removal of matter at the side of the center of gravity at the front and rear ends of the rotor. The weights of the masses to be removed are determined by the position of the center of gravity between the planes where the removals are effected.

Having now particularly described and ascertained the nature of my said invention and the manner in which the same is to be performed, I declare that what I claim is:

1. The combination of a supporting means and a balance lever spaced apart, a fulcrum for the balance lever, means for supporting a rotary body on said supporting means and one end of the balance lever with the axis of said body at right angles to the lever, and at a fixed distance from the lever fulcrum, and means associated with said lever for determining the unbalanced condition of said body with relation to its axis of rotation.

2. The combination of a supporting means and a balance lever spaced apart, a fulcrum for the balance lever, means for supporting a rotary body on said supporting means and one end of the balance lever with the axis of said body at right angles to the plane of the lever, and at a fixed distance from the lever fulcrum, and an adjustable balance weight on the opposite end the lever.

In testimony whereof I affix my signature in presence of two witnesses.

WILLIAM HAMILTON MARTIN.

Witnesses:
VAN GAILLARD,
H. VESCHEPT.